(12) United States Patent
Simeray

(10) Patent No.: US 6,590,190 B1
(45) Date of Patent: Jul. 8, 2003

(54) INDUCTION SYSTEM AND SAFE ARMATURE

(75) Inventor: Jannick Simeray, Colombes (FR)

(73) Assignee: Biotronics S.A., Boulogne (FR)

( * ) Notice: Subject to any disclaimer, the term of this patent is extended or adjusted under 35 U.S.C. 154(b) by 0 days.

(21) Appl. No.: 09/673,619

(22) PCT Filed: Feb. 19, 1999

(86) PCT No.: PCT/FR99/00372

§ 371 (c)(1),
(2), (4) Date: Oct. 19, 2001

(87) PCT Pub. No.: WO99/43186

PCT Pub. Date: Aug. 26, 1999

(30) Foreign Application Priority Data

Feb. 20, 1998 (FR) ............................................. 98 02066

(51) Int. Cl.[7] .............................. H05B 6/06; H05B 6/12
(52) U.S. Cl. ...................... 219/626; 219/663; 219/668; 219/670; 219/672
(58) Field of Search ................... 219/624, 625, 219/626, 627, 672, 670, 676, 675, 665, 668, 663

(56) References Cited

U.S. PATENT DOCUMENTS

| | | | | |
|---|---|---|---|---|
| 4,013,859 A | | 3/1977 | Peters, Jr. | |
| 4,456,807 A | * | 6/1984 | Ogino et al. | 219/626 |
| 5,424,514 A | | 6/1995 | Lee | |
| 5,628,241 A | | 5/1997 | Chavanaz et al. | |
| 5,808,280 A | * | 9/1998 | Gaspard | 219/624 |
| 5,968,398 A | * | 10/1999 | Schmitt et al. | 219/626 |

FOREIGN PATENT DOCUMENTS

DE          37 33 108 C       2/1989

* cited by examiner

Primary Examiner—Philip H. Leung
(74) Attorney, Agent, or Firm—Millen, White, Zelano & Branigan, P.C.

(57) ABSTRACT

The invention concerns an induction system for heating, re-heating and keeping warm a food container combining an armature beneath the container, an induction device supporting the container optimised for the safety of the user, the electromagnetic compatibility, and preserving the induction device since the induction is activated only in the presence of an appropriate armature.

14 Claims, 5 Drawing Sheets

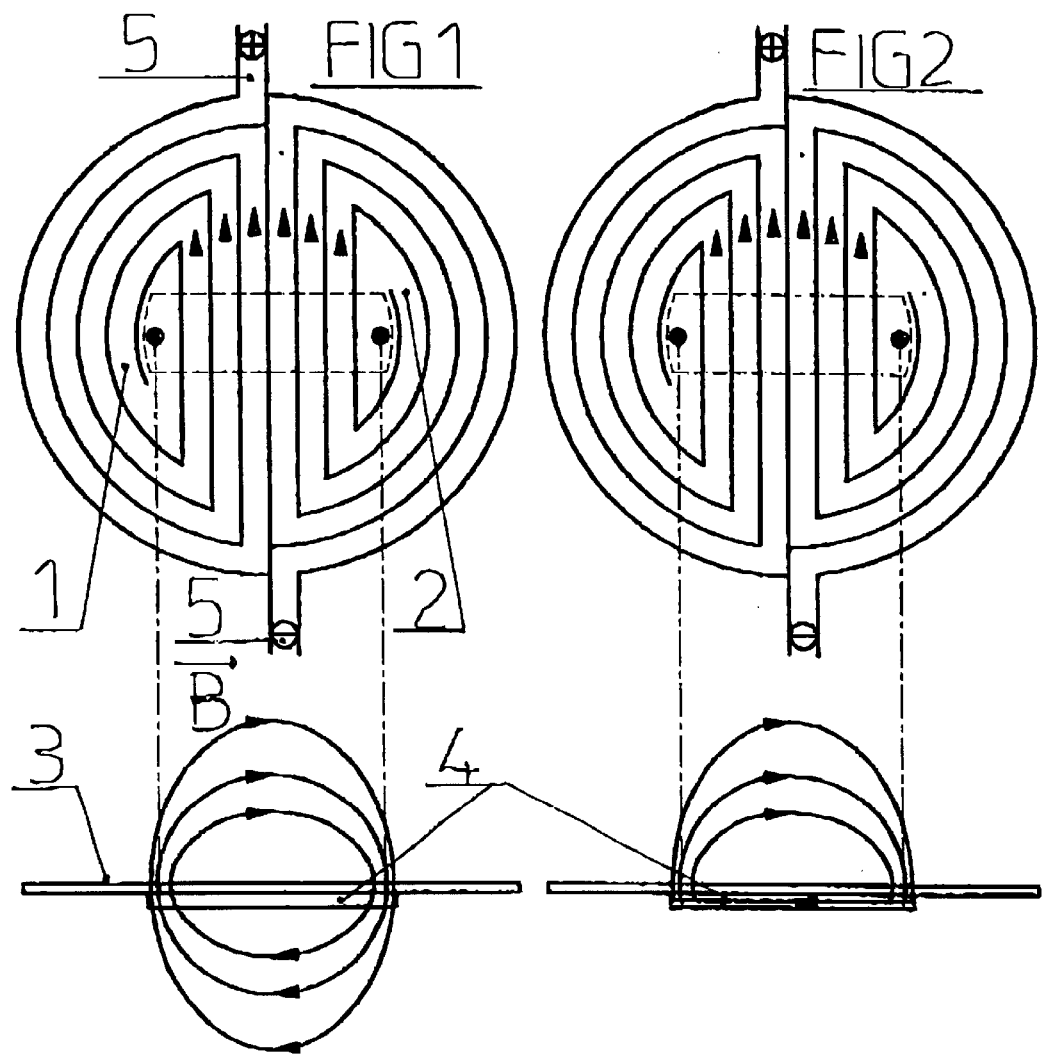
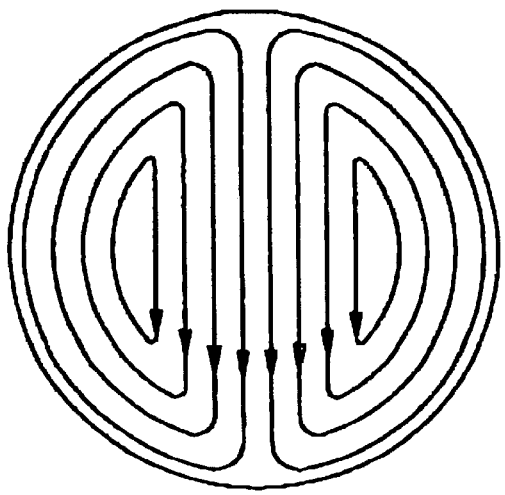

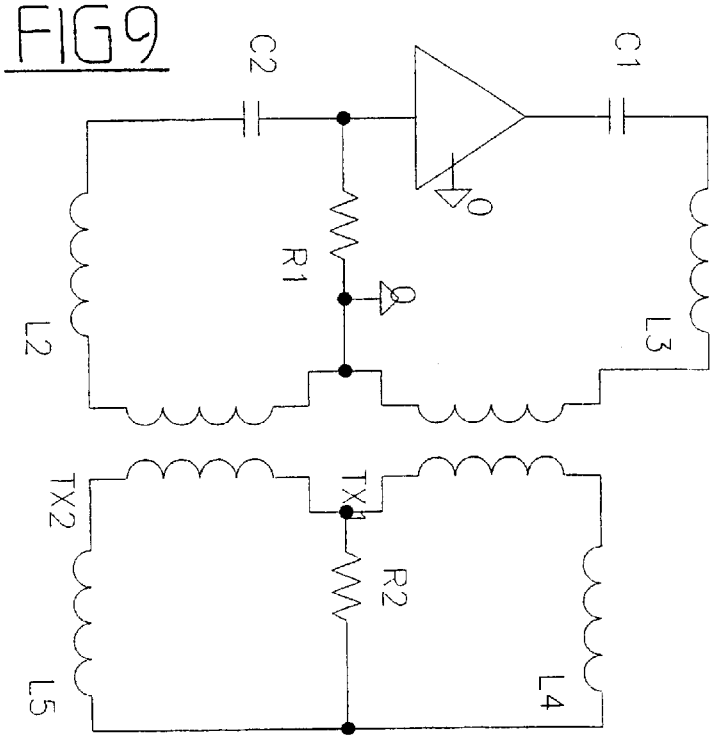
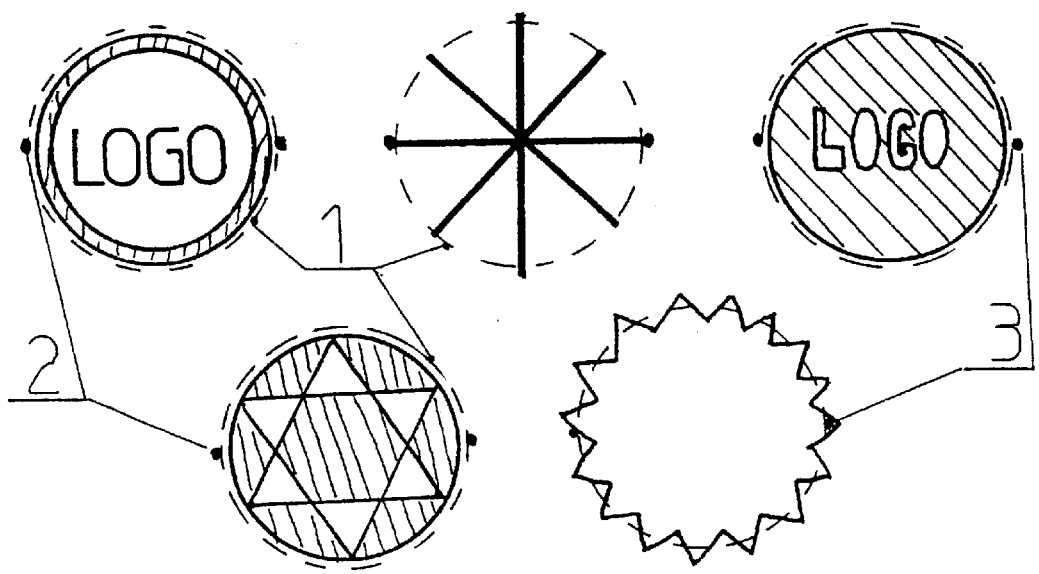

INDUCTION SYSTEM AND SAFE ARMATURE

This invention describes an armature for induction heating of a food container such as a plate or dish, saucepan, bowl, glass or bottle.

The armature is located in, on or under the bottom of said container.

The armature is deposited, engraved, cut out and then glued, integrated, machined, or stamped, on, under or in the bottom of the container. The armature can also be part of the structure of the container (saucepan or specific pastry boat). It can also be chemically, physically, mechanically or thermally treated in a selective manner.

More specifically, the invention describes an armature intended for heating in the presence of a specific inductor, having characteristics which improve user safety, protection of the inductor from power surges, and electromagnetic compatibility (so-called EMC) of heating. Certain aspects of the specific inductor contribute to the invention.

Zones of potential application for induction heating and cooking are especially sensitive to EMC, in particular hospitals, which have a great deal of electronic instrumentation, aircraft, nursing homes, trains and boats. Absolute respect for the EMC restriction is the condition for development of inductive heating in these markets.

Induction-heated plates are described in Patent Application FR 9614475 and Utility Model Application FR 9706059 by the same inventor, and inductor examples are also described. This invention can be adapted to inductors and armatures described in these documents, and reference will be made in the description to inductor and armature diagrams.

Protection of the inductor, which is located in a base of the container, such as a tray, place mats, or an induction plate, requires that the container having an armature have an impedance that conforms to the standard.

If an armature is too conductive, it risks short-circuiting the inductor and producing a power surge of heat detrimental to its service life.

An armature which is too resistant will produce too little heat.

The heating power is controlled by the user, with effective powers varying within a wide range. It is therefore important that measurement of instantaneous power not be the only factor taken into account by the inductor in triggering its safe mode.

Protection of the consumer means that the inductor cannot induce current anywhere other than the containers intended for this purpose. This also contributes to preservation of the power source of the induction system, and the inductor tray or placements can be used without fear that the presence of a metallic ground will trigger induction.

Thus, the inductor does not react to the presence of place settings, saucepans, bracelets, watches, and other things, such as mobile phones.

Electromagnetic compatibility requires that the inductor not emit into the environment an electromagnetic field capable of disturbing any electronic devices.

Electromagnetic compatibility is optimized by the following inductor characteristics:

Confinement of the magnetic field, low frequency of the electromagnetic field, low rate of harmonics, actuation of induction exclusively in the presence of the armature absorbing the radiation, strong coupling between the armature and the inductor.

According to the invention, the inductor is a flat circuit comprising two coils 1 and 2 as shown by the embodiment in FIG. 1.

We would like to point out the opposite directions of the coils, and magnetic field B which crosses the two coils.

FIG. 1 shows a coil example created in a flat circuit 3.

FIG. 2 shows another embodiment of the inductor created from a flat circuit, containing a ferromagnetic piece of sheet metal to confine the field.

FIG. 3 shows the geometry of the inductor currents.

FIG. 9 describes an embodiment of the generator circuit which shows the action of the sensor when it actuates induction.

Figure 4:
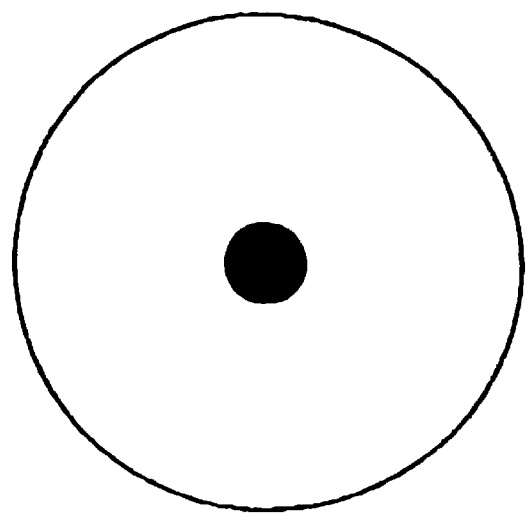
FIG. 4 shows an embodiment of the armature according to the invention.
Figure 5:
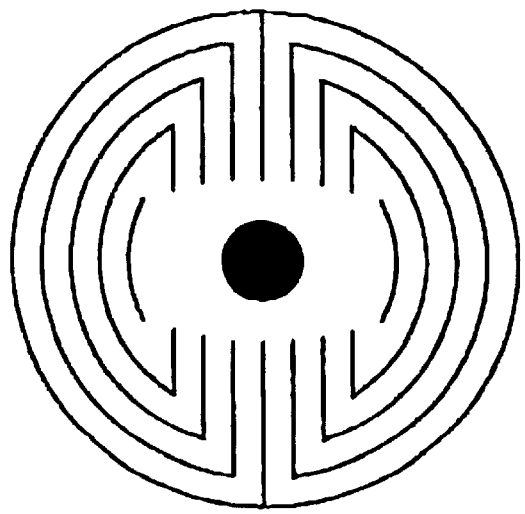
FIG. 5 shows an embodiment of an armature according to the invention, whose angular orientation controls heating.

FIG. 10 describes several arrangements whose function is equivalent to the arrangements in FIGS. 4 and 5.

One preferred but not exclusive embodiment is described in an embodiment of FIG. 1. On a thin double-sided circuit 3, two conductor strips 1 and 2 are engraved (black line), coiled in two spirals heading in opposite directions. On the lower face, a conductor strip 4 closes the circuit by connecting the two centers of the spirals. Alternating induced magnetic field B emerges from one of the coils and converges toward the second one. It is confined by the structure of the inductor. Voltage source 5 generates induction currents.

A second type of inductor shown in FIG. 2 confines the field even more effectively, by guiding it into the plane of the circuit, on the lower side. In this embodiment, strip 4 is a simple ferromagnetic and conductive piece of sheet metal, and it guides and traps the magnetic field, while leading the current from one spiral to the other.

In this embodiment, the inductor does not generate a free magnetic field under the circuit, and almost the entire field is trapped. Thus, only the upper face generates the induction. This second inductor circuit is especially optimized to meet electromagnetic compatibility restrictions for the protection of the consumer and his electronic instruments.

The circular-shaped inductor circuit is intended to induce layer currents in a disc-shaped armature of the same diameter.

FIG. 3 shows layer currents which travel around the inductor. Currents with the same geometry but reverse sign will travel around a disc-shaped armature or conductor plate situated opposite to the inductor.

This geometry describes that of the currents of any uniformly conductive armature situated opposite to the inductor.

In particular, such currents will travel around a metallic dish, a saucepan, or an aluminum pastry boat.

In order to differentiate such induction receivers from standard armatures, induction should only be actuated in the presence of induced currents having the described geometry.

Thus, the standard armatures are armatures through which a geometry of currents different from the preceding one travels. They therefore have a detectable difference, and this difference remains regardless of the relative angle of orientation between the armature and the inductor.

The armature shown in FIG. 4 distributes current differently from the way a uniform disc does.

It has a collection space in the center of a diameter roughly a tenth the diameter of the armature disc. The conductive or ferromagnetic material is drawn into this disc.

This is a non-restrictive embodiment of an armature suitable for a particular distribution of current.

Simple engraving of an insulating ring with a diameter roughly a tenth of the diameter of the armature is also suitable.

Engraving of any pattern with a perimeter roughly a tenth of the diameter of the armature is also suitable.

Engraving of a mark, a logo, or a pattern in the deposited material, in negative or positive, inscribed in an engraved disc, is also suitable.

The armature shown in FIG. 4 represents an embodiment of an armature whose heating power is not sensitive to the angular orientation of said, and whose pattern can be detected in comparison to a uniform plate regardless of the angular orientation.

The armature of FIG. 5, which has known patterns in Patent Applications 9614475 and 9706059, also has the central zone engraved or with a resist, to generate recognizable induced currents.

Here, too, the following engravings or resists are suitable: a resist disc, an engraved ring, a logo or a mark in negative or in positive, inscribed into a disc, a pattern in positive or negative, each one of these having a perimeter with a diameter roughly a tenth of the diameter of the armature.

As mentioned in Patent Applications 9614475 and 9706059, the armature is made of a conductive and diamagnetic material, or even a ferromagnetic and conductive material:

in the first case, the magnetic field extends from the armature;

in the second case, the magnetic field is confined within the armature.

Confinement of the magnetic field is total, with association of an inductor of the type shown in FIG. 2 and an armature of the type shown in FIG. 4 or 5 made of a ferromagnetic and conductive material.

Thus, this ensures an almost total electromagnetic compatibility.

Confinement of the field is partial between an inductor of the type shown in FIG. 1 and an armature of the type shown in FIG. 4 or 5, even ferromagnetic, and between an inductor of the type shown in FIG. 2 and conductive armatures of type 4 or 5.

Confinement of the field is purely geometric between an inductor of the type shown in FIG. 1 and conductive armatures like those shown in FIG. 4 or 5. A good coupling restrains the residual field, however.

One of the means for optimizing the EMC consists in only emitting induction in the presence of a standard armature that is properly coupled and that absorbs radiation, and emitting nothing otherwise.

For a uniform armature, the induced currents are the reverse reflection of currents through which the inductor travels. If the currents encounter an obstacle, however, they circumvent it the shortest way possible. The central engraved zone or resist zone is an obstacle for the induced uniform current.

Figure 6:
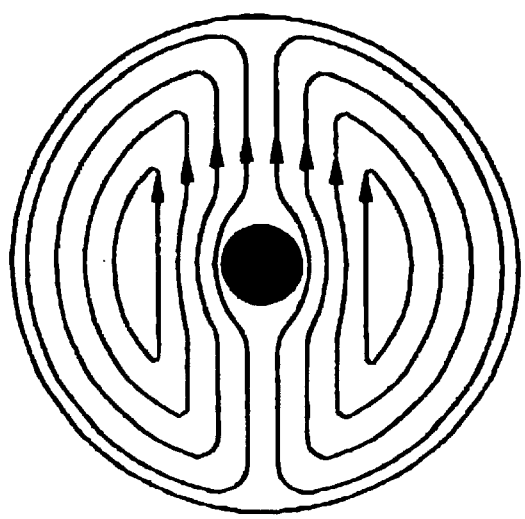
FIG. 6 shows the distribution of currents in the armature of FIG. 4.

FIG. 6 shows the geometry of currents induced in the armatures of FIGS. 4 and 5, by inductors of FIGS. 1 and 2.

These currents are similar to those of FIG. 3 with the exception of the central zone. The current layer circumvents this zone.

It is this feature which makes a standard armature different from a plate.

Consequently, specific currents in the presence of a standard armature are the vertical difference between the currents of FIG. 3 and those of FIG. 6.

Figure 7A:
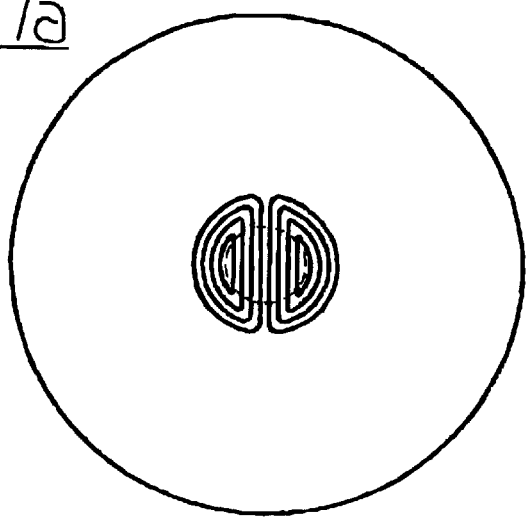
FIGS. 7a, 7b and 7c show the vector sum of the induced currents and inductor currents.

FIG. 7a shows the difference between induced currents and inductor currents, for an armature having the central pattern. These currents are called discriminating induced differential currents.

Figure 7B:
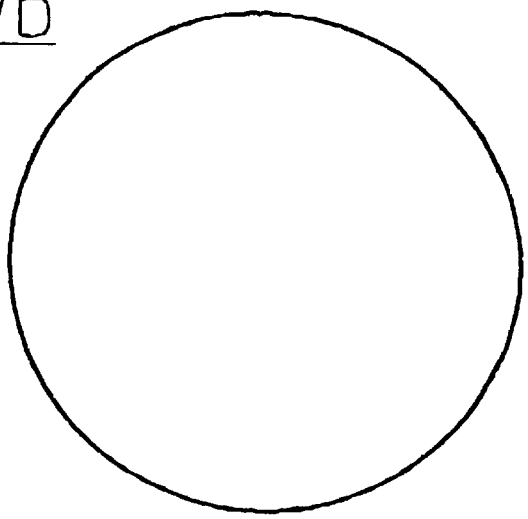

FIG. 7b shows the difference between the induced currents and the inductor currents for a uniform plate: these currents are zero in perfect coupling.

Figure 7C:
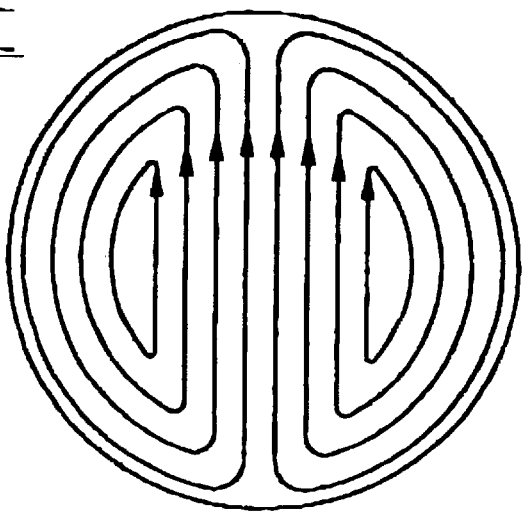

FIG. 7c shows the currents of the inductor in the absence of armature of any kind.

There can be observed a distribution which is highly characteristic of current in the presence of an armature having a central pattern.

A standard armature, i.e., one which has a central pattern, will therefore be detected by associating the inductor with a circuit which is sensitive to induction generated by a distribution of current such as the one shown in FIG. 7a, and insensitive to a current distribution of type 7b or 7c.

Figure 8A:
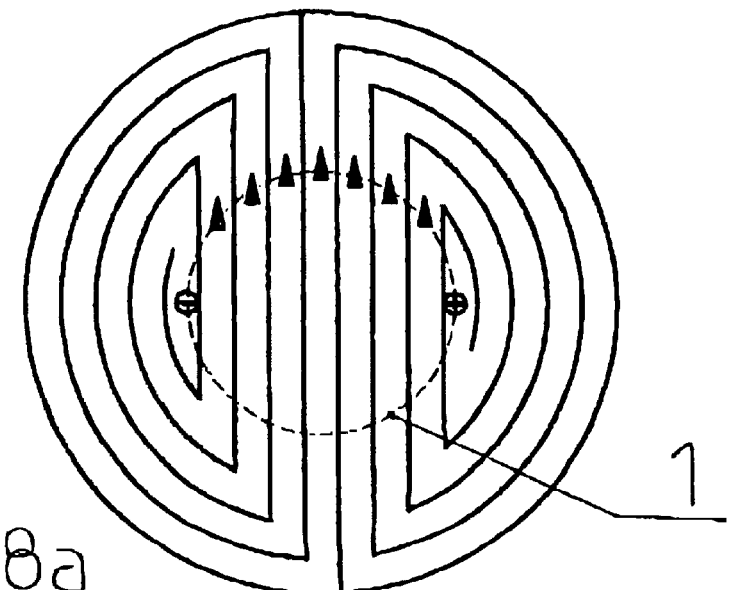
FIGS. 8a and 8b show the inductive sensor which detects the presence of the plate.
Figure 8B:
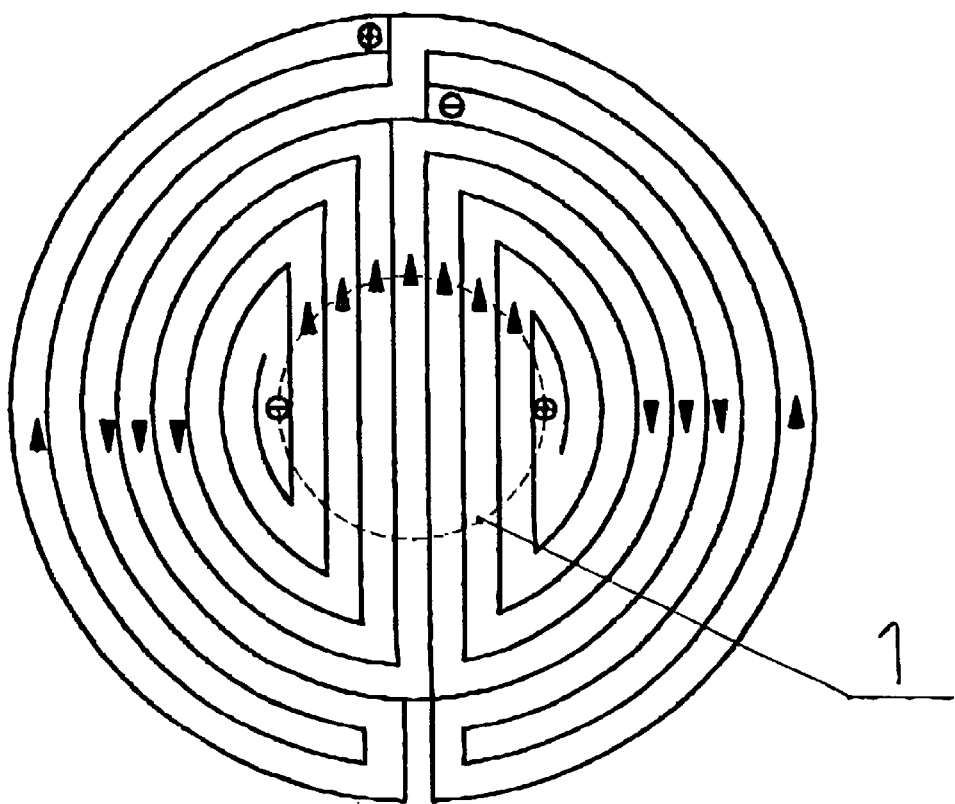

FIGS. 8a and 8b show two non-restrictive examples of a receiver that picks up the induction of a type 7a current distribution. The coils assume the geometry and direction of the discriminating induced differential currents. The center of each spiral is located more or less on the perimeter of the resist, engraved, marked, etc., zone. The signal from receiver 8a is generated at terminals marked + and −. For 8b it is suitable to put the two circuits in series by connecting the + of one to the − of the other. The signal of 8b is then emitted to free terminals.

These receivers are insensitive to inductions of type 7b and 7c, a condition necessary for discrimination to be perfect.

Consequently:

An inductor of the type of FIG. 1 or 2 couples currents in uniform plates and in standard armatures of the FIG. 4 or 5 type.

Armatures of the FIGS. 4 and 5 type couple currents in receivers of type 8a or 8b.

Uniform plates do not couple current in receivers of type 8a and 8b.

Inductors of type 1 or 2 do not couple current in receivers of type 8a or 8b.

This type of discriminated operation is perfectly suitable for ensuring the safety of individuals and electronic devices, and it is also suitable for improving the compatibility of inductors and armatures, even without confinement of the magnetic field.

FIG. 9 shows an embodiment of an inductor circuit that does not operate:

in the absence of the standard armature;

in the presence of a non-standard metal plate and which spontaneously actuates in the presence of the standard armature.

This circuit is especially remarkable and original in that it detects the presence of an armature without emitting any signal or any current or any magnetic field.

It is only in the presence of the standard armature that the circuit actuates induction.

It would be impossible to disturb the electromagnetic environment any less than having nothing emitted.

There is no better way to ensure safety than having any induction be conditioned on the presence of the absorbing standard armature.

This also has the advantage that it preserves the power source of the inductor.

Finally, with perfect coupling between the inductor and the armature, or even with the choice of an inductor of the FIG. 2 type and a ferromagnetic armature of type 4 or 5, any field is confined, and electromagnetic compatibility is guaranteed.

The electronics in FIG. 9 show a power amplifier, a resonance capacitor C1 and the primary of a transformer TX1 and its residual inductance L3.

TX1 and L3 represent the inductor.

R1 represents the input load resistance of the amplifier.

C2 represents a phase compensating capacitor.

TX2 and L2 represent the induction receiver.

TX1 L4 and R2 represent inductance or the secondary of any armature.

TX2 and L5 represent the inductance and the source of a standard inductor.

An amplifier A insulates an input loop and an output loop. The entire thing forms the inductor circuit linked to the induction detection sensor.

The output loop has a capacitor C1, residual inductance L3 and the primary of a transformer TX1 that is grounded.

The input loop has a grounded resistance R1 which represents the input impedance of amplifier A, a capacitor C2, residual inductance L2 and the secondary of a transformer TX2.

An armature has two loops:

The first connects the secondary of transformer TX1, its residual inductance L4 and a resistance R2, it being understood that the secondary and L4 are intrinsically resistant.

The second loop contains the primary of transformer TX2, its residual inductance L5 and resistance R2.

The inductor is represented by L3 and the primary of TX1.

The induction detection means sensor is represented by L2 and the secondary of TX2.

The heating part of the armature is represented by first loop L4, secondary of TX1 and R2.

The detected part of the armature is represented by L5 and the primary of TX2.

A standard plate contains the detected part of the armature represented by L5 and the primary of TX2 and the heating part of the armature represented by first loop L4, secondary of TX1 and R2.

A non-conforming plate or a metallic plate of any kind have only first loop L4, secondary of TX1 and R2.

Only the standard plate loops the output of amplifier A back towards its input and creates a reaction that immediately causes spontaneous oscillation.

The diagram is clearly that of a spontaneous oscillator from the moment there is coupling between the output and input.

In the absence of an armature, the coupling between the two primaries of transformers TX1 and TX2 is zero: there is no reaction, no induction, since the amplifier has not been controlled.

In the presence of a non-standard armature, TX2, L5 are absent, and there is therefore no induction reaction.

In the presence of a standard armature, there is coupling between by TX1, then by TX2, and therefore a reaction between the output and the input of the amplifier. A spontaneous oscillation appears and maintains itself, and induction is actuated.

Only the coupling with a standard armature and exclusively a standard armature will actuate induction.

The process that combines an inductor according to FIG. 1 or 2, a conductive or ferromagnetic armature according to FIG. 3 or 4, an induction receiver according to diagram 8a or 8b, and a coupled oscillator circuit according to diagram 9 satisfies all the criteria of the invention.

It protects the user and his electronic devices, preserves his electromagnetic environment and the power source of the inductor.

FIG. 10 shows several non-restrictive embodiments of the central zone of the armature. The number 1 designates the circle containing the two centers 2 and 3 of the receiver spirals. Each line or shaded zone represents an engraving or a result in the material of the armature.

The framework of the invention also extends to a central zone of the armature whose conductivity is less, in such a way that the layer currents are turned back from this zone, whose radius is approximately a tenth of that of the armature.

A simple perimeter of the less conductive zone helps perform this function.

A partial engraving of the perimeter or of the zone is suitable as is a conductive or ferromagnetic deposit with a lesser thickness.

A cut-out in a conductive and/or ferromagnetic disc is also suitable. The armature is deposited, engraved, cut out and then glued, integrated, machined, or stamped, on, under or in the bottom of the container. The armature can also be part of the structure of the container (saucepan or specific pastry boat). It can also be chemically, physically, mechanically or thermally treated in a selective manner.

All these processes can be used to create a central pattern.

The aforementioned diameter which is a tenth of the diameter of the inductor is given by way of indication.

A diameter of the central zone between one-third and one-twentieth that of the armature is also suitable.

A variant of the invention consists in creating a pattern whose conductivity is not less but greater, and which therefore does not turn back the currents, but rather confines them.

The current layer is then deformed in a likewise characteristic way; it will therefore be recognized and detected by a specific induction receiver.

According to the invention, a central zone of the less resistant armature, with a diameter roughly a third to a twentieth of that of the diameter of the armature, produces a deformation of the layer currents similar to that shown in FIG. 7a. It will therefore also be detected by a receiver of type 8a or 8b.

In addition to the aforementioned processes, gluing of the pattern, fastening, additional deposition, or brazing will increase a pattern's conduction.

a pattern of this type in the central zone is also indicated for a circular container.

The invention can still be used in all of these versions for a non-circular food container, in connection with a non-circular armature, for which the pattern will not need to be central.

In fact, a non-circular armature could be linked to a non-circular inductor and therefore the angle of orientation of the armature on the inductor will be fixed, and the pattern will not be restricted to having a central symmetry and geometry.

Finally, the circuit shown in FIG. 9 is a good example of the implementation of an induction generating circuit, the generation of which is conditioned on detection and presence of the standard armature.

This diagram is not restrictive, and any circuit whose generation of induction is conditioned on detection of the signal emitted by the discriminating receiver is suitable.

What is claimed is:

1. A system including an induction device and an armature, comprising:

the armature being made of a conductive material or a conductive and ferromagnetic material, located in, on or under the bottom of a food container for heating food in the container, reheating the food or keeping the food warm, an inductor and an induction group generator circuit optimized for the safety of the user and the user's electronic devices and property, preservation of the electromagnetic environment, preservation of an induction source and an induction generator, wherein, the inductor has an induction receiver detector which detects the presence of said armature, which controls the induction generator, the generator being connected to actuate induction only in the presence of said armature on the inductor, a conductor and/or ferromagnetic plate on the inductor which does not actuate induction, and the induction generator being configured to emit no radiation or induction in the absence of said armature.

2. The system according to claim 1, wherein the armature has a specific shape or a surface conductivity recognized by the induction device.

3. The system according to claim 2, wherein the induction device recognizes the geometry of currents induced in an armature having a central pattern and differentiates the central pattern from a current layer inducted in a uniform plate.

4. The system according to claim 1, wherein the armature has a pattern created by deposition, engraving, cut-out, machining, stamping or chemical treatment, the conductivity of which pattern is different.

5. The system according to claim 4, wherein the pattern is less conductive than the armature without the pattern and resists any induced current layer therefrom.

6. The system according to claim 4, wherein the pattern is more conductive than the armature without the pattern and confines an induced current layer.

7. The system according to claim 1, wherein the angle of orientation of the inductor in relation to the armature has no influence on the inductor.

8. The system according to claim 1, wherein the armature has a circular shape and a central pattern.

9. The system according to claim 1, wherein the induction device has an induction receiver detector which distinguishes a deformed induced current layer comprised of a flat circuit armature having a coil geometry which is the image of discriminating induced differential currents.

10. The system according to claim 1, wherein the induction device has an electronic induction generator circuit for delivering inductor currents to an inductor only in the presence of an armature positioned opposite to said inductor.

11. The system according to claim 10, wherein the generator is operated only as long as a signal is emitted by an inductor detector receiver.

12. The system according to claim 11, wherein the inductor has a voltage amplifier circuit for delivering an inductor current to the inductor, in series with a resonance capacitor, controlled at the input by the detector in series with a phase compensating capacitor.

13. The system according to claim 1, wherein the induction device has an inductor with a magnetic field optimized for EMC, whereby the magnetic field is confined in a lower face of the inductor by a ferromagnetic piece of sheet metal.

14. The system according to claim 1, wherein the armature has a circular shape of a selected diameter and a central pattern with a diameter which is one-third to one-twentieth of the diameter of said armature.

* * * * *